United States Patent [19]

Nakamura

[11] Patent Number: 4,778,288

[45] Date of Patent: Oct. 18, 1988

[54] AUTOMATIC PRINT ZONE SETTING SYSTEM

[75] Inventor: Keiji Nakamura, Yamatokoriyama, Japan

[73] Assignee: Sharp Kabushiki Kaisha, Osaka, Japan

[21] Appl. No.: 932,352

[22] Filed: Nov. 19, 1986

[30] Foreign Application Priority Data

Nov. 29, 1985 [JP] Japan .................................. 60-270068

[51] Int. Cl.⁴ .......................... B41J 11/44; B41J 13/00
[52] U.S. Cl. ......................................... 400/76; 400/61; 400/83
[58] Field of Search ...................... 400/76, 61, 64, 279, 400/83; 364/518, 519

[56] References Cited

FOREIGN PATENT DOCUMENTS

| 31788 | 2/1983 | Japan | 400/76 |
| 138655 | 8/1983 | Japan | 400/76 |
| 217186 | 10/1985 | Japan | 400/76 |

OTHER PUBLICATIONS

*IBM Tech. Disc. Bulletin*, by D. T. Wang, vol. 23, No. 10, Mar., 1981, pp. 4690–4691.
*IBM Tech. Disc. Bulletin*, by T. L. Adam, vol. 25, No. 1, Jun., 1982, pp. 217–220.
*IBM Tech. Disc. Bulletin*, vol. 28, No. 5, Oct., 1985, pp. 2072–2075.

*Primary Examiner*—Paul T. Sewell
*Attorney, Agent, or Firm*—Birch, Stewart, Kolasch & Birch

[57] ABSTRACT

A print zone setting system has a key input device for inputting print format and the width and height of the area available for printing on a print sheet, and a processor for calculating the lateral and vertical dimensions of the print zone in the area available for printing with reference to the information received from the input means. Since it is not necessary for the operator to calculate the print zone, efficiency in printing operation is remarkably enhanced.

7 Claims, 3 Drawing Sheets

AUTOMATIC PRINT ZONE SETTING SYSTEM

BACKGROUND OF THE INVENTION

1. Field of the Invention

The present invention relates to a print zone setting system in a word processing apparatus such as a Japanese word processor.

2. Description of the Prior Art

In the printing out of document data by the printer of a word processing apparatus, the operator may use print paper of a nonstandard size not conforming to the Japanese Industrial Standard (JIS) such as A4 or B4. With the conventional Japanese word processor, in printing out characters laterally on the nonstandard size paper, the operator sets the number of characters to be printed out on a line with reference to the character size and the print paper width, and the maximum number of lines on the print paper with reference to the character size and the printing pitch.

In setting a print format for the conventional Japanese word processor, as mentioned above, the operator must calculate the number of characters on a line and the maximum number of lines on the print paper by himself. It is understood that operation is extremely complicated particularly when the print paper size is not standard. In addition, since calculation of the number of characters on a line and the number of lines on each paper requires the operator to have accurate knowledge of character size, a printing operation is quite difficult.

OBJECT AND SUMMARY OF THE INVENTION

Objects of the Invention

Accordingly, an object of the present invention is to provide a novel print zone setting system in a word processing apparatus.

Another object of the present invention is to provide a print margin setting system which automatically calculates a desired print margin with reference to the size of a print paper sheet.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Summary of the Invention

According to the print zone setting system of the present invention, in printing document data on a print-receiving sheet of a given size, the print zone can be easily set by measuring and inputting the height and width of the printable area on a desired print-receiving object, so that printing operation efficiency is remarkably increased.

The print zone setting system of the present invention includes means for inputting the height and width of the printable area on a print-receiving object as well as the print format, and a processor for receiving the information from the input means, whereby the lateral and vertical length of the print zone on the print-receiving sheet are calculated according to the information on the print format and the height and width of the printable area on the print-receiving sheet input from the input means.

According to the present invention, as described above, the print format and the height and width of the printable area on a print-receiving sheet are input via the input means. The processor calculates the lateral and vertical lengths of the print zone on the print-receiving sheet with reference to the data given via the input means. Since it is not necessary for the operator to calculate the size of the printing zone, printing operation efficiency is markedly enhanced.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
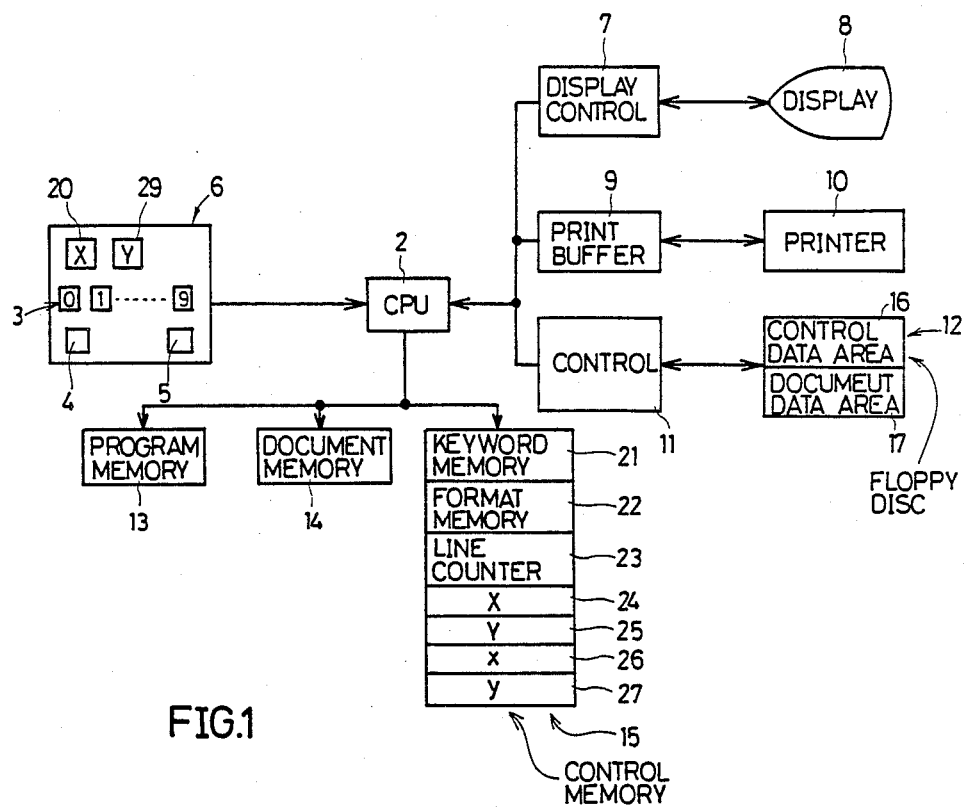
FIG. 1 is a block diagram showing the construction of a Japanese word processor in one embodiment of the present invention.

FIG. 1 is a block diagram showing the construction of a Japanese word processor of an embodiment of the present invention. The word contains a processor 2 realized, for example, by a CPU (central processing unit) which is connected with a key input device 6. The key input device 6 includes a group of numeral keys 3, a call key 4 and a print key 5. The processor 2 is further connected through a display control 7 to a display 8 realized, for example, by a CRT (cathode ray tube), through a print buffern 9 to a printer 10, and through a controller 11 to a floppy disc device 12 as an external memory.

In addition, a program memory 13 realized by ROM (read-only-memory), a document memory 14 realized by RAM (random-access-memory) and a control member 15 realized by a RAM are connected in parallel to the processor 2. The program memory stores programs for operating the processor 2, the document memory 14 stores document data input from the key input device 6, and the control memory 15 stores print format and the height and width of a print-receiving sheet in the respective memory regions for reference in the printing operation of the word processor.

Figure 2:
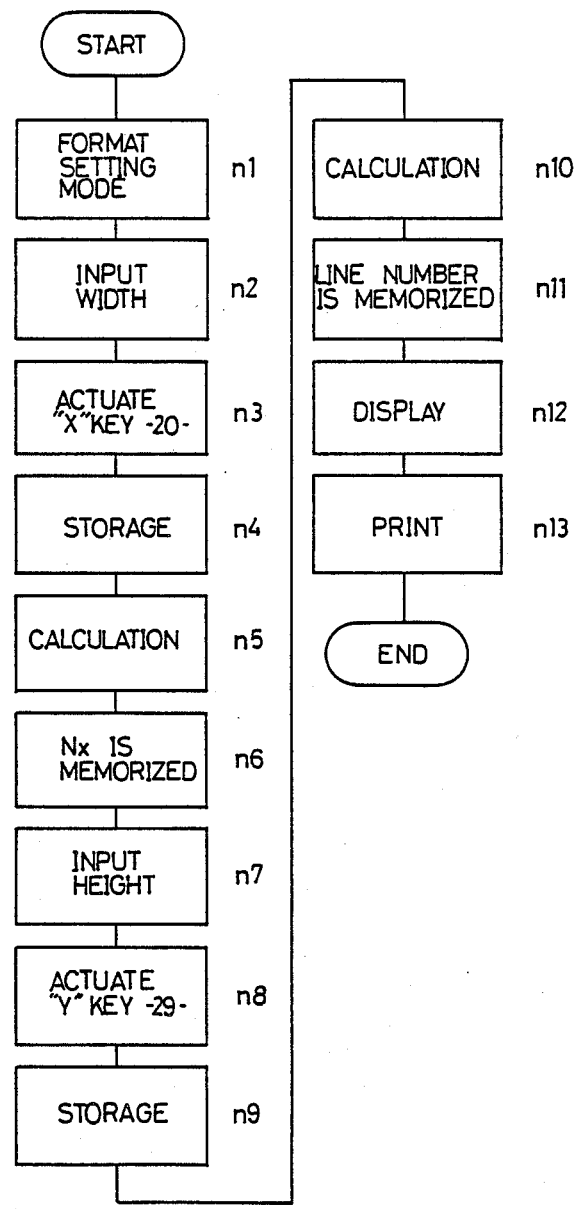
FIG. 2 is a flow chart for explaining the operation of the word processor of FIG. 1.

FIG. 2 is a flow chart for explaining the operation of the word processor of the present invention. Operation of the word processor of the present invention is described now with reference to FIGS. 1 and 2. Document data stored in the floppy disc device 12 is read and printed out by the word processor. The floppy disc of the floppy disc device 12 includes a control data area 16 and a document data area 17. The control data area 16 stores indexes composed of, for example, numerals of three digits, and the document data area 17 is divided into a plurality of blocks corresponding to the indexes and stores document data in each block.

When a desired index of the floppy disc is designated by operating numeral keys 3 and the call key 4 on the key input device 6, the document data corresponding to the index is called out of the floppy disc. The controller 11 controls the floppy disc device 12 for the calling operation. The document data called out of the floppy disc is stored in the document memory 14. The system of the present invention may be designed so that the called document data is presented on the display 3 simultaneously as it is stored in the document memory 14.

Figure 3:
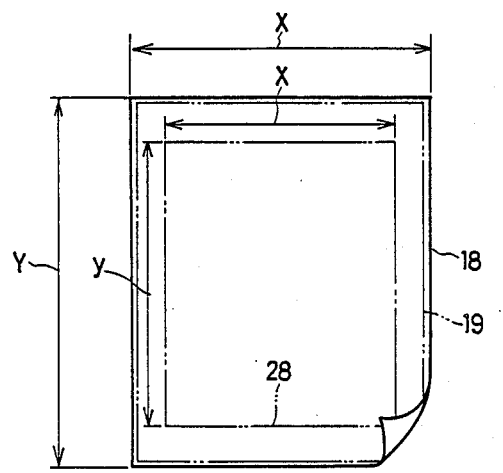
FIG. 3 shows a print sheet on which document data is printed out by a printer included in the word processor of FIG. 1.

FIG. 3 shows a print paper 18 on which data is printed out by the printer 10. It is assumed that the width "X" and height "Y" of the print paper 18 do not conform to those specified in JIS (Japanese Industrial Standard) such as A4 or B4. The operator is supposed to measure the lateral dimension "X" and vertical dimension "Y" of the area available for printing (in this embodiment, the entire area) of the print paper.

The operational process is described now with reference to FIGS. 2 and 3. In the step "n1" of FIG. 2, the word processor is made to enter the format setting mode by key operation on the key input device 6. In the step "n2", the lateral dimension "X" of the print paper is input by using numeral keys 3 on the key input means 6. In the step "n3", the "X" key 20 is depressed to allow the processor 2 to process the input value as the width of the print paper 18.

The width "X" thus input is stored in the X memory area 24 of the control memory 15 in the step "n4". Then in the step "n5", the processor calculates the value "Nx", the number of character to be printed out on each lateral line for the width "X" of the print paper, referring to the format data such as character size stored in the format memory area 22 of the control memory 15. The "Nx" characters should fit in the printing zone 28 of the print paper 18. The value "Nx" is stored in the x memory area 26 of the control memory 15 in the step "n6".

Figure 4:
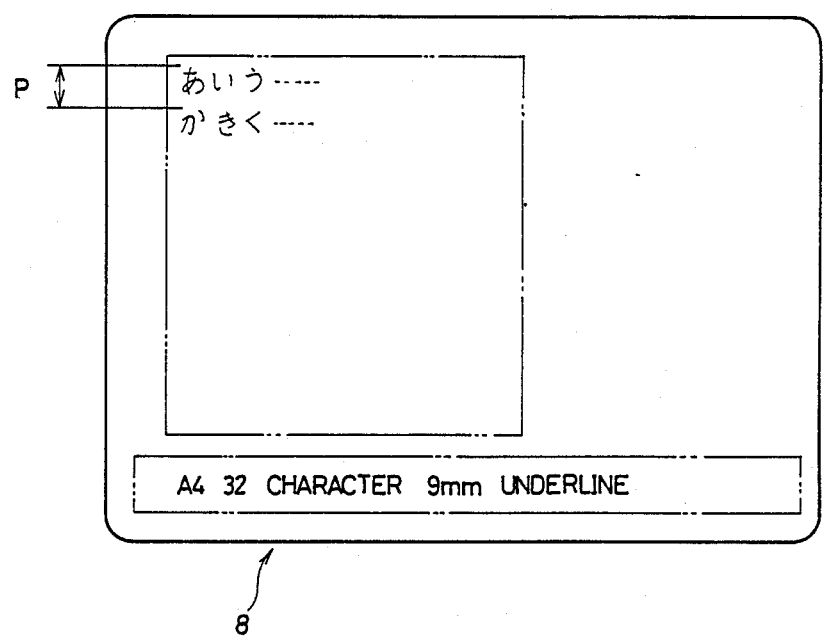
FIG. 4 shows an example of the picture on a display included in the word processor of FIG. 1.

In the step "n7", the vertical dimension "Y" of the print paper 18 is input from the key input means 6. In the step "n8", the "Y" key 29 is depressed to allow the processor 2 to process the input value as the height of the print paper 18. The value "Y" is stored in the Y memory area 25 of the control memory 15 in the step "n9". The processor 2 calculates the number of character lines to be printed out on each print paper with reference to the value "Y" stored in Y memory area 25 and the line pitch "P" (see FIG. 4) stored in the format memory area 22 in the step "n10", and stores it in the y memory area 27 of the control memory 15 in the step "n11".

According to the present invention, as understood from the above, it is extremely easy to set the printing zone 28 of the print paper 18 even when the print paper size does not conform to the provision in JIS.

Document data registered in the floppy disc device 12 is read out by the registration name which is stored in the key word memory 21 of the control memory 15. When document data is read from the floppy disc device 12, with the print zone set as described above, it is printed out with reference to the format data (such as character size, line pitch, number of characters on a line, and number of character lines on a page) stored in the control memory 15. The control memory 15 is provided with a line counter 23 which counts the number of lines of the document data, for reference in printing as well as in the vertical movement of the cursor of the display 8.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A print zone setting apparatus for a word processor comprising:

input means for inputting document data, a document data print format, an actual printing paper width, and an actual printing paper height;

processor means for processing information recieved at said input means;

means for displaying said print format, said actual printing paper width and height, and document data;

means for printing document data;

control means for selectively retrieving document data and control information relating to said document data for use in said processor means;

program memory means, connected to said processor means, for storing operating programs of said processor means;

document memory means, connected to said processor means, for storing document data input by said input means;

control memory means, connected to said processor means, for storing said print format data and paper width and height data input at said input means;

whereby said processor means automatically calculates lateral and vertical dimensions of a print zone within said input actual paper width and height dimensions according to said input document data and document data print format.

2. The print zone setting apparatus according to claim 1, wherein said print format includes character size and line pitch.

3. The apparatus according to claim 1, wherein said control memory means includes a keyword memory corresponding to stored document data, a format memory for storing character size data and line pitch data, a line counter for counting a number of lines of document data, and memories for storing both the input width and height printing paper information, the number of characters per lateral line, and the number of character lines per printing paper.

4. The apparatus according to claim 1, wherein said processor means furter calcualtes the number of characters to be printed out on each of a plurality of lateral lines with reference to an actual input paper width and character size data stored in the format memory area of said control memory means.

5. The apparatus according to claim 1, wherein said processor means further calculates the number of character lines to be printed out on a single print paper with reference to an actual input paper height and line pitch information stored in the format memory area of said control memory means.

6. The apparatus according to claim 1, wherein a print zone may be set for any input size paper.

7. A process for setting a print zone in a word processor, comprising the steps of:

(a) setting a format mode into which document data is to be structured;

(b) inputting an actual paper width of printing paper;

(c) storing said actual paper width in a memory;

(d) calculating a number of characters from said document data which will appear on each of a plurality of lateral printing lines;

(e) storing the number of characters for each lateral printing line as calculated in step (d);

(f) inputting an actual paper height of said printing paper;

(g) storing said actual paper height in a memory;

(h) calculating a number of character lines to be printed out on each of a plurality of printing papers with reference to said stored paper height and line pitch information corresponding to document data in said word processor;

(i) storing the number of character lines calculated in step (h);

(j) determining a print zone defined by the stored number of character lines and number of characters for each lateral printing line; and (k) printing the document data from said word processor into a predetermined printing zone of step (j).

* * * * *